United States Patent
Turner et al.

(10) Patent No.: US 11,266,055 B2
(45) Date of Patent: Mar. 8, 2022

(54) ARTICULATED COMPONENT BRAKING SYSTEM

(71) Applicant: CNH Industrial Canada, Ltd., Saskatoon (CA)

(72) Inventors: Jack Turner, Saskatoon (CA); Gordon Anthony Engel, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 244 days.

(21) Appl. No.: 16/246,060

(22) Filed: Jan. 11, 2019

(65) Prior Publication Data
US 2020/0221624 A1 Jul. 16, 2020

(51) Int. Cl.
| | | |
|---|---|---|
| *A01B 49/06* | (2006.01) | |
| *A01B 63/32* | (2006.01) | |
| *A01B 49/02* | (2006.01) | |
| *A01C 7/20* | (2006.01) | |
| *A01C 7/16* | (2006.01) | |
| *A01C 15/00* | (2006.01) | |
| *B60T 1/08* | (2006.01) | |
| *A01B 73/00* | (2006.01) | |

(52) U.S. Cl.
CPC .......... *A01B 49/065* (2013.01); *A01B 49/022* (2013.01); *A01B 63/32* (2013.01); *A01C 7/16* (2013.01); *A01C 7/201* (2013.01); *A01C 7/208* (2013.01); *A01C 15/003* (2013.01); *B60T 1/08* (2013.01); *A01B 73/00* (2013.01)

(58) Field of Classification Search
CPC ..... A01B 49/022; A01B 49/065; A01B 49/00; A01B 49/04; A01C 7/16; A01C 7/08; A01C 7/20; A01C 7/208; A01C 15/003; A01C 15/00; A01C 15/007; B60T 1/08

USPC ......................................................... 111/173
See application file for complete search history.

(56) References Cited

U.S. PATENT DOCUMENTS

| | | |
|---|---|---|
| 4,078,685 A | 3/1978 | Corbin et al. |
| 4,137,852 A | 2/1979 | Pratt |
| 4,196,797 A * | 4/1980 | Taylor .................... B65G 23/26 188/171 |
| 4,789,016 A | 12/1988 | Mihail |
| 5,112,184 A | 5/1992 | Tapper et al. |
| 6,192,994 B1 | 2/2001 | Friggstad et al. |
| (Continued) | | |

FOREIGN PATENT DOCUMENTS

WO 2005/045256 A1 5/2005

OTHER PUBLICATIONS

"Owners Operating Manual 2800 & 3350 Air Cart", retrieved from http://www.amitytech.com/wp-content/uploads/2013/11/330538-9920-Operators-702060-.pdf, Amity Technology, LLC, Fargo, North Dakota, Nov. 28, 2016 (59 pages).

(Continued)

*Primary Examiner* — Thomas W Irvin
(74) *Attorney, Agent, or Firm* — Rebecca L. Henkel; Rickard K. DeMille

(57) ABSTRACT

An air seeder cart has a fill auger pivotally mounted to the frame of the air seeder cart and moveable to position the fill auger for filling seed hoppers. The swivel joint for the air seeder has a brake assembly biased by a spring to prevent movement in the absence of an input. A remotely positioned lever and cable assembly unlock the brake assembly for movement to a new position upon an operator input to the lever.

7 Claims, 4 Drawing Sheets

(56) References Cited

U.S. PATENT DOCUMENTS

| | | | |
|---|---|---|---|
| 7,267,519 B2 | 9/2007 | Cresswell et al. | |
| 7,458,526 B2 | 12/2008 | Honermann et al. | |
| 7,575,398 B2 | 8/2009 | Lloyd et al. | |
| 8,272,527 B2 | 9/2012 | Horn | |
| 8,606,454 B2 | 12/2013 | Wang et al. | |
| 8,876,456 B2 | 11/2014 | Kowalchuk et al. | |
| 8,893,845 B2 * | 11/2014 | Stilwell | B60T 13/686 |
| | | | 180/370 |
| 8,915,200 B2 | 12/2014 | Barsi et al. | |
| 8,944,239 B2 * | 2/2015 | Campbell | B65G 21/14 |
| | | | 198/588 |
| 9,127,509 B2 | 9/2015 | Robinson et al. | |
| 9,187,259 B2 | 11/2015 | Van Mill et al. | |
| 9,434,366 B1 * | 9/2016 | Taneyhill | B60T 13/662 |
| 9,834,126 B2 * | 12/2017 | Neufeld | B60P 1/42 |
| 2006/0120836 A1 | 6/2006 | Cresswell et al. | |
| 2009/0321154 A1 | 12/2009 | Johnson | |
| 2011/0315493 A1 * | 12/2011 | Stilwell | B60T 13/662 |
| | | | 188/152 |
| 2013/0079980 A1 | 3/2013 | Vuk et al. | |
| 2014/0227068 A1 * | 8/2014 | Neufeld | B65G 65/425 |
| | | | 414/304 |
| 2016/0090711 A1 | 3/2016 | Sumiyoshi et al. | |
| 2016/0229328 A1 * | 8/2016 | Neufeld | B60P 1/42 |

OTHER PUBLICATIONS

"New Equipment-old—Freilings Agricultural Equipment", retrieved from http://frielingagequipment.com/new-equipment-old/3013325, Nov. 28, 2016 (9 pages).

"Operator's Manual, Eight Series XL VRT Air Cart", retrieved from www.morris-industries.com/wp-content/.../8XL-VRT_Operators-V3_N44297-03A.pdf, Morris Industries, Ltd., Nov. 2011 (170 pages).

* cited by examiner

ARTICULATED COMPONENT BRAKING SYSTEM

FIELD OF THE INVENTION

The present invention relates to mechanical joints and, more specifically, to articulated mechanical joints used in farm equipment.

BACKGROUND OF THE INVENTION

One of the essential tools in the agricultural field is a cart that meters and supplies bulk seeds to row units of an air seeder for seeding of a field with an agricultural crop. Many such devices take the form of air carts in which seeds are metered and distributed to a series of spaced row units using pressurized air. One of the principal functions of such a cart is to fill the bulk seed hoppers which are located on the upper portion of the cart. A conveyor device such an auger is mounted to the side of the air cart and is pivoted between a storage or transportation position to a position where it is elevated for a discharge chute to distribute seeds through a fill opening in the upper surface of the hoppers. The fill auger is elongated and can reach lengths of thirty feet or more. As such, it is a bulky component to be manipulated to properly fulfill its function. In order to facilitate pivotal movement of the fill auger, its structure is such that it is finely balanced so that a single person can easily move it. Although this allows single person manipulation, it introduces problems in the event the air cart is being filled in windy weather or on sloped terrain. The auger can swing out of alignment with the tank and result in improper distribution of seeds.

Accordingly, what is needed in the art is a system that stabilizes the elongated fill auger as well as elongated components used in a variety of applications.

SUMMARY OF THE INVENTION

The present invention seeks to provide an elongated component manipulation only when desired by an operator.

In one form, the invention is an articulated elongated component assembly including a support frame, an elongated component, an articulated joint connecting the elongated component to the support frame and permitting relative movement in at least one plane. A brake assembly is biased to lock relative movement at the at least one articulated frame. An actuator is connected to the brake assembly to unlock it upon receipt of an input and a device remote from the actuator provides the input to selectively provide the input and release the brake assembly for movement about the plane.

In another form, the invention is air seeder cart including a frame, ground support wheels, at least one seed hopper and a seed metering device receiving seeds from the at least one seed hopper. An elongated fill auger, including a discharge spout and a fill hopper is mounted to the air seeder cart frame by an articulated joint between the fill auger and the frame. The articulated joint permits movement in at least one plane and a brake assembly is biased to lock relative movement in the at least one plane. An actuator is configured to unlock the brake assembly upon receipt of an input and a device remote from the actuator selectively provides the input to release the brake assembly and permit relative movement.

An advantage of the present invention is the prevention of unwanted movement of a large elongated component.

Another advantage is that an operator has greater control over the movement of the elongated part with associated safety.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
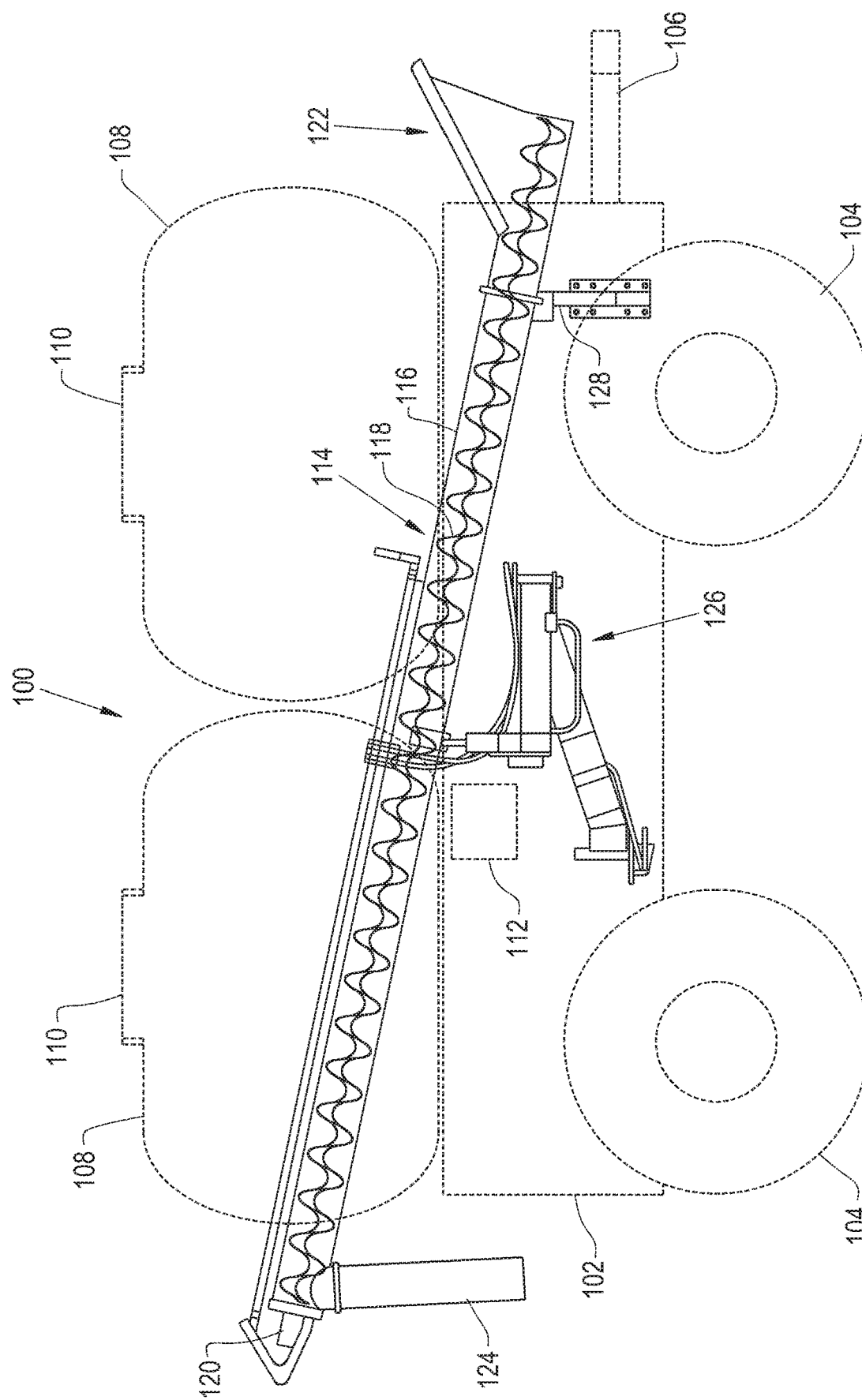
FIG. 1 is a side view of an air seeder cart with some elements illustrated in a phantom view, with which the present invention may be utilized.
Figure 2:
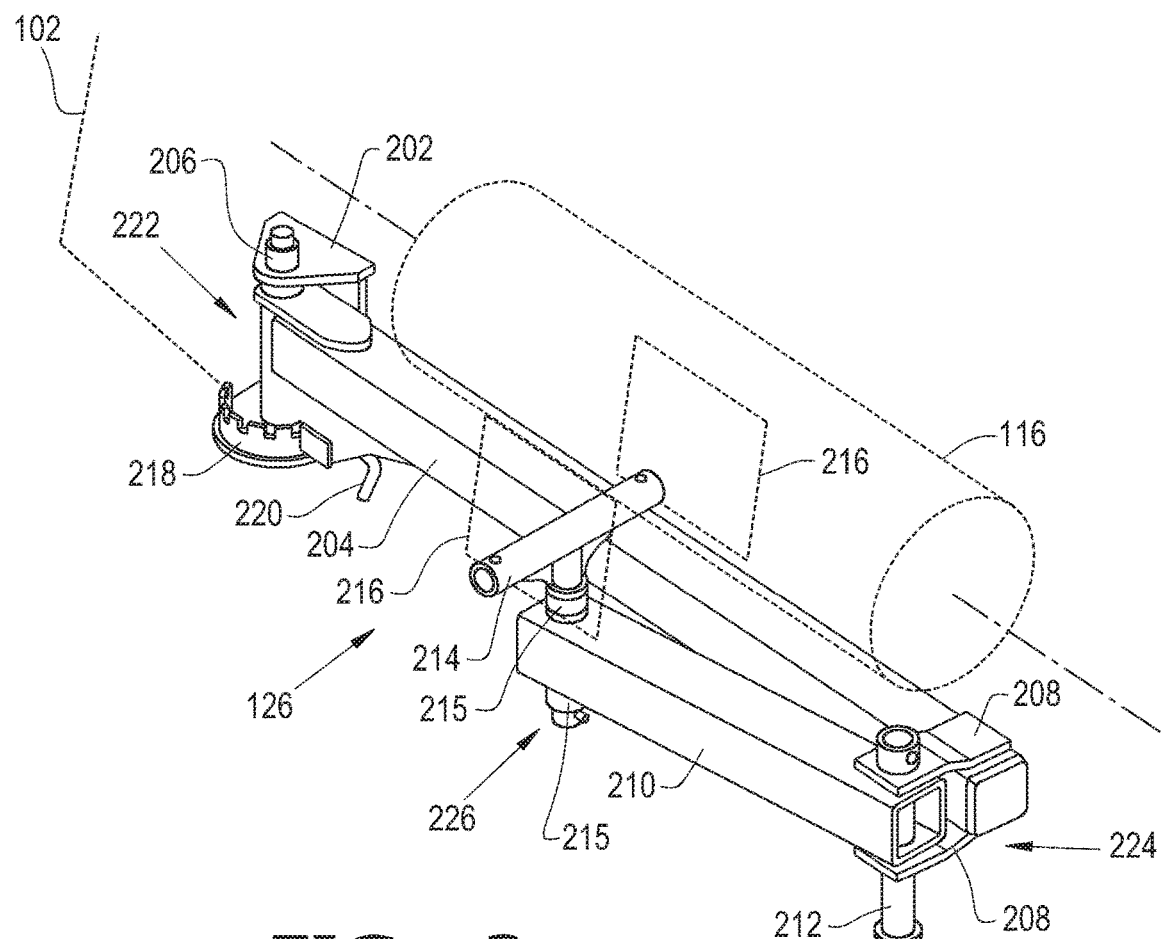
FIG. 2 illustrates an expanded view of an articulated joint found in the air seeder cart of FIG. 1.

Referring to FIGS. 1 and 2 of the drawings there is shown an agricultural implement 100 in the form of an air seeder cart enjoying widespread use in the agricultural field. The agricultural implement includes a frame 102, ground support wheels for movement along the ground, and a hitch 106 for towing purposes. The implement 100 is usually used in connection with an air seeder and will be towed by a tractor (not shown) either before or after the air seeder. The implement has first and second seed hoppers 108 mounted on frame 102 with fill openings 110 on their upper surface. Seed hoppers 108 deliver bulk seed by gravity to a seed metering and distributing unit 112 for metering and distribution to planting units used in connection with implement 100. These elements of the above components are shown in phantom view, so as to enable a clear focus on the present disclosure.

An elongated component in the form of a fill auger assembly 114 is used to deliver seeds to the seed hoppers 108. Fill auger 114 has an elongated, generally cylindrical, housing 116 receiving an elongated auger 118 driven by an appropriate motor 120 for moving seed from a seed hopper 122 to a discharge tube 124. Fill auger 114 is mounted to the frame 102 by an articulated joint 126, to be described in detail in FIG. 2. Fill auger 114 rests on a support bracket 128 also mounted to frame 102 when the fill auger is in a transport or stowed position. Although FIG. 1 illustrates a fill auger, it should be apparent to those skilled in the art that elongated conveying systems other than the auger 118 may be utilized with the present disclosure. In both instances, the means for conveying seeds are elongated and generally heavy components.

Referring now to FIG. 2, the articulated joint 126 includes a U-bracket 202 mounted to frame 102. A first arm 204 is pivotally mounted to U-bracket 202 by a pin 206. The opposite end of first arm 204 has hinge brackets 208 on opposite sides that pivotally receive a second arm 210 by means of a pin 212 at one end of the second arm 210. The opposite end of the second arm 210 has a T-bar 214 pivotally mounted through bushings 215. T-bar 214 is received in fill auger support brackets 216 to enable the fill auger 114 to be pivoted between the illustrated transport or stowed position shown in FIG. 1 and a fill position in which the fill auger 114 is taken off of support bracket 128 and the seed hopper 122 lowered to ground level while at the same time the discharge tube 124 is raised sufficiently to clear the tops of the seed hoppers 208 and deliver seeds through the openings 110 when the motor 120 is activated to drive auger 118. The U-bracket 202 may have a series of pivot position notches 218 permitting a releasable lock 220 to be disengaged permitting manipulation of first arm 204 to an appropriate position at which the releasable lock 220 is inserted to lock the first arm 204 in place.

The joints described above form a first pivot joint 222 at bracket 202, a second pivot joint 224 at brackets 208 and a third pivot joint 226 at the T-bar 214. In broader terms, these joints may be referred to as articulated joints permitting many degrees of freedom. As shown, they illustrate pivoting movement in a single plane but it should be apparent to one skilled on the art that the invention may be applied to articulated joints having three degrees of freedom with equally beneficial results.

In operation, the fill auger 114 is pivoted from its illustrated stowed position of FIG. 1 to a filled position as described above. The fill auger 114 has a substantial length and heavy mechanical componentry associated with it. Accordingly, the pivot for fill auger 114 at the T-bar 214 is designed so that the auger is finely balanced permitting manipulation by an operator. While this permits movement of the fill auger 114 simply and effectively, it is, in many cases, so finely balanced that a positioning on a hill or in windy conditions can cause unwanted movements of the fill auger 114 at the pivotal joints. In accordance with the present disclosure, the brake assemblies illustrated in FIGS. 3-6 provide control over the unwanted movement.

Figure 3:
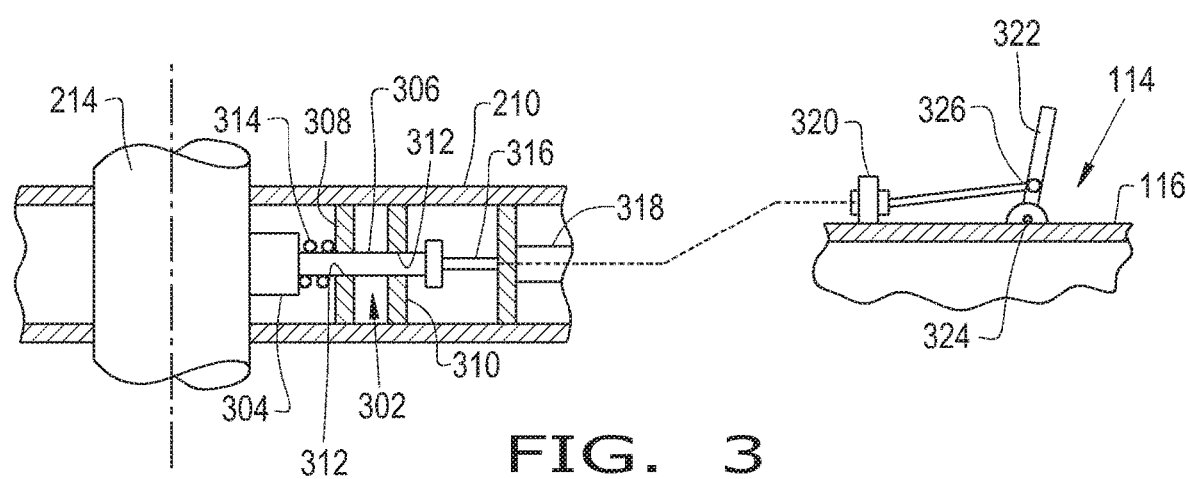
FIG. 3 illustrates a brake assembly used with the articulated joint of FIGS. 1 and 2, in accordance with one exemplary embodiment of the present invention.

Referring first to FIG. 3, there is shown a brake assembly 302 that is mounted so as to impede pivotal movement of T-bar 214 relative to arm 210. It should be noted that the brake assembly mechanism 302 may be utilized on any one of the articulated joints in the implement 100. Brake assembly 302 includes a friction pad 304 mounted on a shaft 306 displaceable through bulkheads 308 and 310 via openings 312. The friction pad 304 is illustrated as abutting T-bar 214 and thus preventing relative pivotal movement between T-bar 214 and arm 210. The friction pad 304 is yieldably urged against T-bar 214 by a spring 314 acting on the friction pad 304 and the bulkhead 308. The amount of force applied to T-bar 214 is calculated to inhibit pivoting movement under the expected operating conditions of the elongated fill auger 114 that is attached to the T-bar 214.

A cable 316 is connected to the end of shaft 306 and extends through a sheath 318 to a bracket 320 remotely located from the brake assembly 302 and in this case mounted on the fill auger housing 116. Cable 316 extends to a lever 322 at pivotal connecting point 326 between the outer end of lever 322 and its pivotal attachment 324 to the housing 116. Thus, the auger is prevented from rotation by the friction pad 304 acting against T-bar 214 in the absence of any input. When the operator desires to reposition housing 116, the lever 322 is moved in a direction to pull cable 316 and thus pull friction pad 304 from T-bar 214. It is noted that the friction pads 304 acts directly on the curved surface of T-bar 214. It should be apparent to those skilled in the art that any form of a curved surface may be provided as an interaction between the brake friction element and the component whose pivoting movement is to be controlled. In addition, the cable connection between the pivotal connecting point 326 and the free end of lever 322 provides a mechanical advantage facilitating operator movement.

Figure 4:
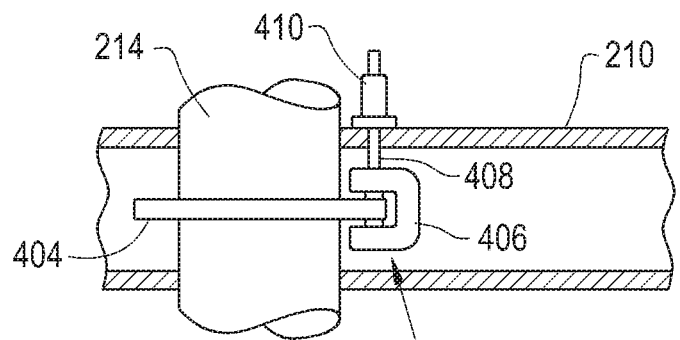
FIG. 4 illustrates a brake assembly used with the articulated joint of FIGS. 1 and 2, in accordance with another exemplary embodiment of the present invention.

FIG. 4 shows an alternative form of a brake assembly 402 which has a rotor 404 affixed to T-bar 214 and captured by a disk caliper 406 that has internal moveable friction pads urged by a spring assembly into contact with the rotor 404. These parts are not illustrated to enable a clearer presentation of the invention. A cable 408 connected to the disk pads is encased in a sheath 410 and is manipulated by a remote lever or assembly to disengage the disk calipers and thus permit movement.

Figure 5:
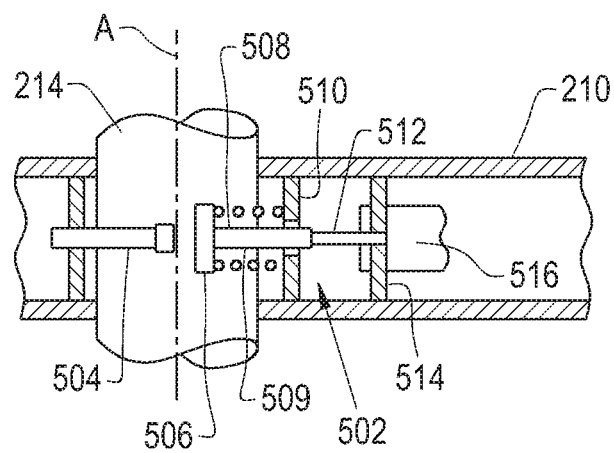
FIG. 5 illustrates a brake assembly used with the articulated joint of FIGS. 1 and 2, in accordance with still another exemplary embodiment of the present invention.

FIG. 5 shows still another embodiment of a brake assembly 502 having a pair of semi-circular band friction pads 504 in the form of half circles with a pivotal interconnection on the opposite side of T-bar 214 as viewed in FIG. 5 and on an axis parallel to the axis A of T-bar 214. One of the band friction pads 504 has a flange 506 that is biased towards engagement by a spring 508 mounted over a guide shaft 509. Guide shaft 509 is slidable through a bulkhead 510 which provides a stop for spring 508 to urge flange 506 into braking engagement in the absence of an input. A cable 512 is connected to the end of shaft 509 and extends through a sheath 516 to a similar lever mechanism to displace the friction pads out on engagement.

Figure 6:
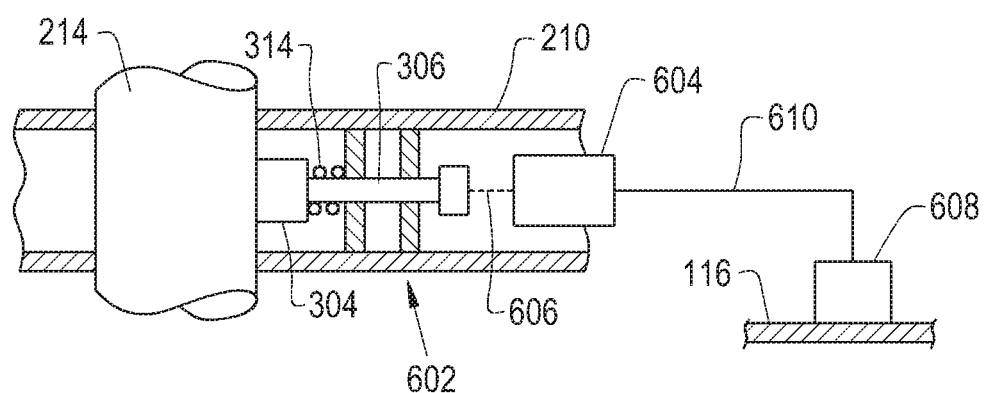
FIG. 6 illustrates a brake assembly used with the articulated joint of FIGS. 1 and 2, in accordance with an additional exemplary embodiment of the present invention.

The brake assemblies illustrated in FIGS. 3-5 show a mechanical lever system between the brake assemblies and the remote location. FIG. 6 illustrates still an alternative embodiment. In this arrangement, the friction pad 304 is urged against T-bar 214 by spring 314. A solenoid 604 is connected to the end of shaft 306 by an appropriate mechanical connection (shown schematically) so that in the absence of an input to the solenoid 604, the friction pad 304 remains engaged with T-bar 214. A switch 608 is remotely mounted on housing 116 and supplies current to solenoid 604 from an appropriate source (not shown) via line 610 to displace friction pad 304 from T-bar 214 and thus permit movement upon operator input. As soon as the operator input is terminated, the solenoid is disengaged and the friction pad 304 is again urged against T-bar 214.

Figure 7:
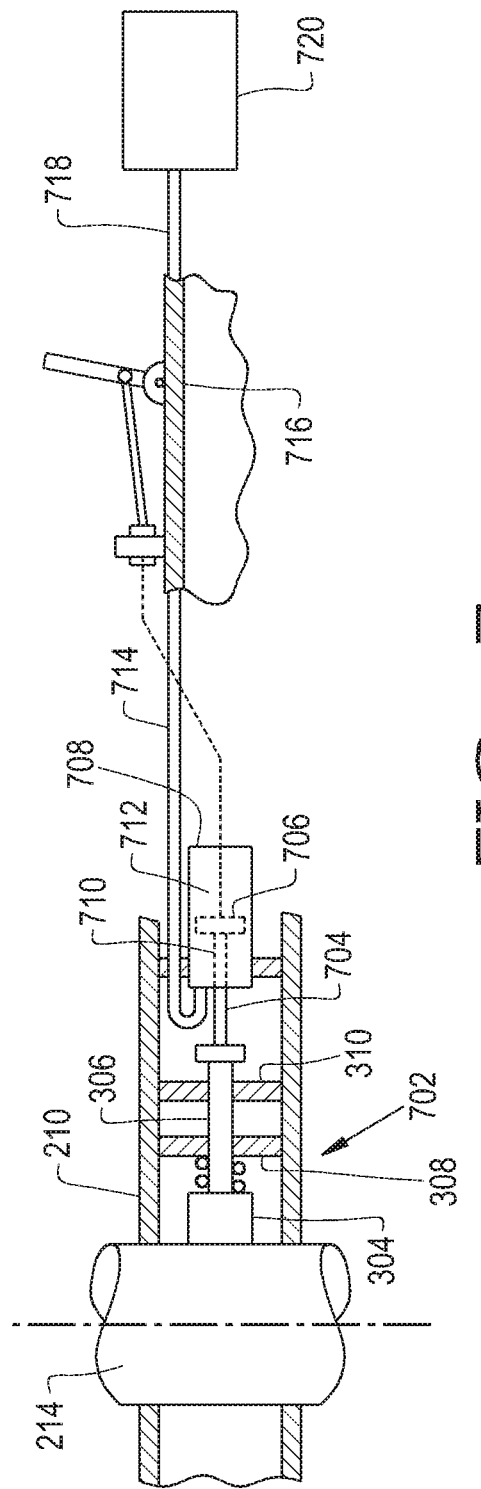
FIG. 7 illustrates a brake assembly used with the articulated joint of FIGS. 1 and 2, in accordance with still another exemplary embodiment of the present invention.

FIG. 7 illustrates another embodiment in which a brake assembly 702 uses air pressure for engagement and disengagement of friction pad 304 with the T-bar 214. A shaft 704 connects with and is an extension of shaft 306, displaceable through bulkheads 308 and 310. The end of shaft 704 connects to a piston 706 slidable in cylinder 708 to form first and second variable chambers 710 and 712. A pneumatic line 714 is fluidly connected to first chamber 710 and to an operator controlled valve 716. Operator controlled valve 716 is in turn connected to a pressurized air source 720 by a pneumatic line 718. As illustrated, second chamber 712 is pre-pressurized to a level high enough to yieldably urge piston 706 to the left to press friction pad 304 against T-bar 214 and restrain its movement. When an operator desires to move the fill auger 114, the valve 716 is opened to direct pressurized air from the source 720 to first chamber 710, thus urging piston 706 in a direction to disengage friction pad 304 with T-bar 214 and permit movement.

As illustrated in FIG. 7, the mechanism holding friction pad 304 in place is pneumatic by virtue of the pre-pressurized chamber 712. This feature may be employed on any of the other embodiments shown in FIGS. 3-6. Likewise, the spring 314 may be used in the embodiment of FIG. 7. In this configuration, the second chamber 712 is vented to atmosphere so that the spring 314 urges the piston 706 to the left and the pressurized air urges the piston 706 to the right for disengagement.

Several alternative embodiments of brake mechanisms have been illustrated. Additional brake configurations may be employed as is apparent to those skilled in the art. For example, the spring 314, which acts to yieldably urge the brake assemblies into engagement in the absence of a signal, may be replaced by another mechanism such as a pneumatic spring or other device. The mechanism for physically displacing the friction pads or other brake engaging elements may also be pneumatic or hydraulic as appropriate for the particular application. In all these cases, the parts of the articulated junctions are held in place and only permitted to move when an operator so chooses. This effectively eliminates the unwanted movement encountered by prior art devices, thus improving operability and safety.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An articulated elongated component assembly comprising:
   a support frame connected to at least a portion of an agricultural implement;
   an elongated component positioned on a lateral side of the support frame;
   at least one articulated joint including at least one arm connecting said elongated component to said support frame permitting relative movement in at least one plane;
   a brake assembly connected to a portion of said at least one articulated joint and biased to lock relative movement at said at least one articulated joint in the absence of an input;
   an actuator connected to said brake assembly to unlock said brake assembly upon the receipt of an input; and
   a device remote from said actuator to selectively generate and communicate said input to said actuator;
   wherein said actuator comprises a fluid responsive valve element for releasing said brake assembly upon receipt of fluid pressure, and a valve for controlling fluid pressure to a fluid responsive piston upon an operator input for releasing said brake assembly.

2. The articulated elongated component assembly as claimed in claim 1, wherein said elongated component is pivotally rotatable in said at least one plane.

3. The articulated elongated component assembly as claimed in claim 2, wherein said brake assembly is a mechanical brake assembly.

4. The articulated component assembly as claimed in claim 3, wherein said brake assembly is yieldably urged into a braking position in the absence of an input.

5. The articulated elongated component assembly of claim 4, wherein said brake assembly is biased by a spring.

6. The articulated elongated component assembly of claim 5, wherein said brake assembly has a friction pad yieldably urged against an element rotatable with said elongated component.

7. The articulated elongated component assembly as claimed in claim 3, wherein said brake assembly is one of a disk and caliper, curved surface and friction pad and semi-circular band friction pads.

* * * * *